(12) United States Patent
Bennati et al.

(10) Patent No.: US 11,914,747 B2
(45) Date of Patent: Feb. 27, 2024

(54) METHOD, APPARATUS, AND COMPUTER PROGRAM PRODUCT FOR QUANTIFYING THE LINKABILITY OF TRAJECTORY DATA

(71) Applicant: HERE GLOBAL B.V., Eindhoven (NL)

(72) Inventors: Stefano Bennati, Zurich (CH); Aleksandra Kovacevic, Wettswil (CH)

(73) Assignee: HERE GLOBAL B.V., Eindhoven (NL)

( * ) Notice: Subject to any disclaimer, the term of this patent is extended or adjusted under 35 U.S.C. 154(b) by 161 days.

(21) Appl. No.: 17/249,851

(22) Filed: Mar. 16, 2021

(65) Prior Publication Data

US 2022/0300641 A1    Sep. 22, 2022

(51) Int. Cl.
*G06F 21/62* (2013.01)
*H04W 4/02* (2018.01)
*H04W 4/029* (2018.01)
*H04W 12/02* (2009.01)

(52) U.S. Cl.
CPC ........ *G06F 21/6245* (2013.01); *H04W 4/026* (2013.01); *H04W 4/029* (2018.02); *H04W 12/02* (2013.01)

(58) Field of Classification Search
None
See application file for complete search history.

(56) References Cited

U.S. PATENT DOCUMENTS

| 9,129,119 B2 | 9/2015 | Burke et al. | |
| 2014/0108361 A1* | 4/2014 | Biswas | G06F 16/29 707/693 |
| 2019/0373403 A1* | 12/2019 | Ajmeri | H04W 4/021 |

OTHER PUBLICATIONS

H. Wang, Y. Li, C. Gao, G. Wang, X. Tao and D. Jin, "Anonymization and De-Anonymization of Mobility Trajectories: Dissecting the Gaps Between Theory and Practice," in IEEE Transactions on Mobile Computing, vol. 20, No. 3, pp. 796-815, Mar. 1, 2021, doi: 10.1109/TMC.2019.2952774. (Year: 2021).*

Bennati et al., "Privacy Metrics for Trajectory Data Based on K-Anonymity, L-Diversity and T-Closeness", ArXiv abs/2011.09218 (Nov. 2020), 19 pages.

(Continued)

*Primary Examiner* — Alexander Lagor
*Assistant Examiner* — Felicia Farrow
(74) *Attorney, Agent, or Firm* — ALSTON & BIRD LLP

(57) ABSTRACT

The linkability of trajectory data based on similarities to candidate trajectory data is measured and quantified as describer herein. Methods may include: receiving a set of probe data points defining a target trajectory from a probe apparatus; characterizing the trajectory based on features of the target trajectory; identifying a plurality of candidate trajectories sharing at least some features with the target trajectory; calculating, for each of the plurality of candidate trajectories, a similarity score with respect to the target trajectory; calculating a privacy score representing a likelihood of identifying the probe apparatus from the target trajectory based on a number of trajectories in the plurality of candidate trajectories and their respective similarity score; and providing information associated with the target trajectory for location-based services in response to the privacy score satisfying a predetermined value.

20 Claims, 4 Drawing Sheets

(56) References Cited

OTHER PUBLICATIONS

Jin et al., "Trajectory-Based Spatiotemporal Entity Linking", eprint arXiv:2010.01516, (Oct. 4, 2020), 15 pages.
Sattar et al., "A Probabilistic Approach to Mitigate Composition Attacks on Privacy in Non-Coordinated Environments", Knowledge Based Systems, vol. 67 (Apr. 2014), 41 pages.
Wang et al., "Complete Your Mobility: Linking Trajectories Across Heterogeneous Mobility Data Sources", Journal of Computer Science and Technology 33(4), (Jul. 2018), pp. 792-806.

* cited by examiner

METHOD, APPARATUS, AND COMPUTER PROGRAM PRODUCT FOR QUANTIFYING THE LINKABILITY OF TRAJECTORY DATA

TECHNOLOGICAL FIELD

An example embodiment of the present disclosure relates to measuring and quantifying the linkability of trajectory data, and more particularly, to measuring and quantifying the linkability of trajectory data based on similarities to candidate trajectory data.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for to measuring and quantifying the linkability of trajectory data, and more particularly, to measuring and quantifying the linkability of trajectory data based on similarities to candidate trajectory data. According to an example embodiment, an apparatus is provided including at least one processor and at least one memory including computer program code, the at least one memory and computer program code configured to, with the processor, cause the apparatus to at least: receive a set of probe data points defining a target trajectory from a probe apparatus; characterize the trajectory based on features of the target trajectory; identify a plurality of candidate trajectories sharing at least some features with the target trajectory; calculate, for each of the plurality of candidate trajectories, a similarity score with respect to the target trajectory; calculate a privacy score representing a likelihood of identifying the probe apparatus from the target trajectory based on a number of trajectories in the plurality of candidate trajectories and their respective similarity score; and provide information associated with the target trajectory for location-based services in response to the privacy score satisfying a predetermined value.

According to some embodiments, the apparatus is caused to extract relevant points from the set of probe data points defining the target trajectory, where relevant points include an origin point of the target trajectory, a destination point of the target trajectory, and waypoints of the target trajectory. The apparatus of some embodiments is caused to extract a sequence of road links in the target trajectory. Features of the target trajectory include, in some embodiments, one or more of: a time at which the target trajectory was traversed, point-of-interest types in a region corresponding to the relevant points, functional class of road links of the sequence of road links, or travel restrictions of road links of the sequence of road links.

According to some embodiments, causing the apparatus to calculate, for each of the plurality of trajectories, a similarity score with respect to the target trajectory includes causing the apparatus to: calculate, for each of the plurality of candidate trajectories, a similarity between locations of relevant points; calculate, for each of the plurality of candidate trajectories, a similarity between shared road links with the target trajectory; and calculate, for each of the plurality of candidate trajectories, a similarity between a time of traversal of the candidate trajectories with the time at which the target trajectory was traversed. The privacy score of some embodiments increases with a higher number of the plurality of candidate trajectories at least partially overlapping in space and time with the target trajectory. The apparatus of some embodiments is caused to anonymize the target trajectory in response to the privacy score failing to satisfy a predetermine value, where causing the apparatus to anonymize the target trajectory includes at least one of redacting at least a portion of the target trajectory or applying an anonymization algorithm to the target trajectory. The apparatus of some embodiments is further caused to provide information associated with the target trajectory for location-based services in response to the privacy score failing to satisfy a predetermined value and the apparatus being caused to anonymize the target trajectory.

Embodiments provided herein include a computer program product having at least one non-transitory computer-readable storage medium having computer-executable program code portions stored therein, the computer-executable program code portions including program code instructions configured to: receive a set of probe data points defining a target trajectory from a probe apparatus; characterize the trajectory based on features of the target trajectory; identify a plurality of candidate trajectories sharing at least some features with the target trajectory; calculate, for each of the plurality of candidate trajectories, a similarity score with respect to the target trajectory; calculate a privacy score representing a likelihood of identifying the probe apparatus from the target trajectory based on a number of trajectories in the plurality of candidate trajectories and their respective similarity score; and provide information associated with the target trajectory for location-based services in response to the privacy score satisfying a predetermined value.

The computer program product of some embodiments includes program code instructions configured to extract relevant points from the set of probe data points defining the target trajectory, where relevant points include an origin point of the target trajectory, a destination point of the target trajectory, and waypoints of the target trajectory. Embodiments may include program code instructions to extract a sequence of road links in the target trajectory. Features of the target trajectory may include one or more of: a time at which the target trajectory was traversed, point-of-interest types in a region corresponding to the relevant points, functional class of road links of the sequence of road links, or travel restrictions of road links of the sequence of road links.

According to some embodiments, the program code instructions to calculate, for each of the plurality of candidate trajectories, a similarity score with respect to the target trajectory includes program code instructions configured to: calculate, for each of the plurality of candidate trajectories, a similarity between locations of relevant points; calculate, for each of the plurality of candidate trajectories, a similarity score between shared road links with the target trajectory; and calculate, for each of the plurality of candidate trajectories, a similarity between a time of traversal of the candidate trajectories with the time at which the target trajectory was traversed. The privacy score, of some embodiments, increases with a higher number of the plurality of candidate trajectories at least partially overlapping in space and time with the target trajectory. Embodiments may include program code instructions configured to: anonymize the target trajectory in response to the privacy score failing to satisfy a predetermined value, where the program code instructions to anonymize the target trajectory includes program code instructions configured to, at least one of, redact at least a portion of the target trajectory or apply an anonymization algorithm to the target trajectory. Embodiments may include program code instructions configured to provide information associated with the target trajectory for location-based services in response to the privacy score failing to satisfy a predetermined value and the program code instructions anonymizing the target trajectory.

Embodiments provided herein include a method including: receiving a set of probe data points defining a target trajectory from a probe apparatus; characterizing the trajectory based on features of the target trajectory; identifying a plurality of candidate trajectories sharing at least some features with the target trajectory; calculating, for each of the plurality of candidate trajectories, a similarity score with respect to the target trajectory; calculating a privacy score representing a likelihood of identifying the probe apparatus from the target trajectory based on a number of trajectories in the plurality of candidate trajectories and their respective similarity score; and providing information associated with the target trajectory for location-based services in response to the privacy score satisfying a predetermined value.

Methods of some embodiments further include extracting relevant points from the set of probe data points defining the target trajectory, where relevant points include an origin point of the target trajectory, a destination point of the target trajectory, and waypoints of the target trajectory. Methods may further include extracting a sequence of road links in the target trajectory. According to some embodiments, features of the target trajectory include one or more of: a time at which the target trajectory was traversed, point-of-interest types in a region corresponding to the relevant points, functional class of road links of the sequence of road links, or travel restrictions of road links of the sequence of road links.

Embodiments provided herein include an apparatus including: means for receiving a set of probe data points defining a target trajectory from a probe apparatus; means for characterizing the trajectory based on features of the target trajectory; means for identifying a plurality of candidate trajectories sharing at least some features with the target trajectory; means for calculating, for each of the plurality of candidate trajectories, a similarity score with respect to the target trajectory; means for calculating a privacy score representing a likelihood of identifying the probe apparatus from the target trajectory based on a number of trajectories in the plurality of candidate trajectories and their respective similarity score; and means for providing information associated with the target trajectory for location-based services in response to the privacy score satisfying a predetermined value.

An apparatus of some embodiments further include means for extracting relevant points from the set of probe data points defining the target trajectory, where relevant points include an origin point of the target trajectory, a destination point of the target trajectory, and waypoints of the target trajectory. An example apparatus may further include means for extracting a sequence of road links in the target trajectory. According to some embodiments, features of the target trajectory include one or more of: a time at which the target trajectory was traversed, point-of-interest types in a region corresponding to the relevant points, functional class of road links of the sequence of road links, or travel restrictions of road links of the sequence of road links.

BRIEF DESCRIPTION OF THE DRAWINGS

Figure 1:
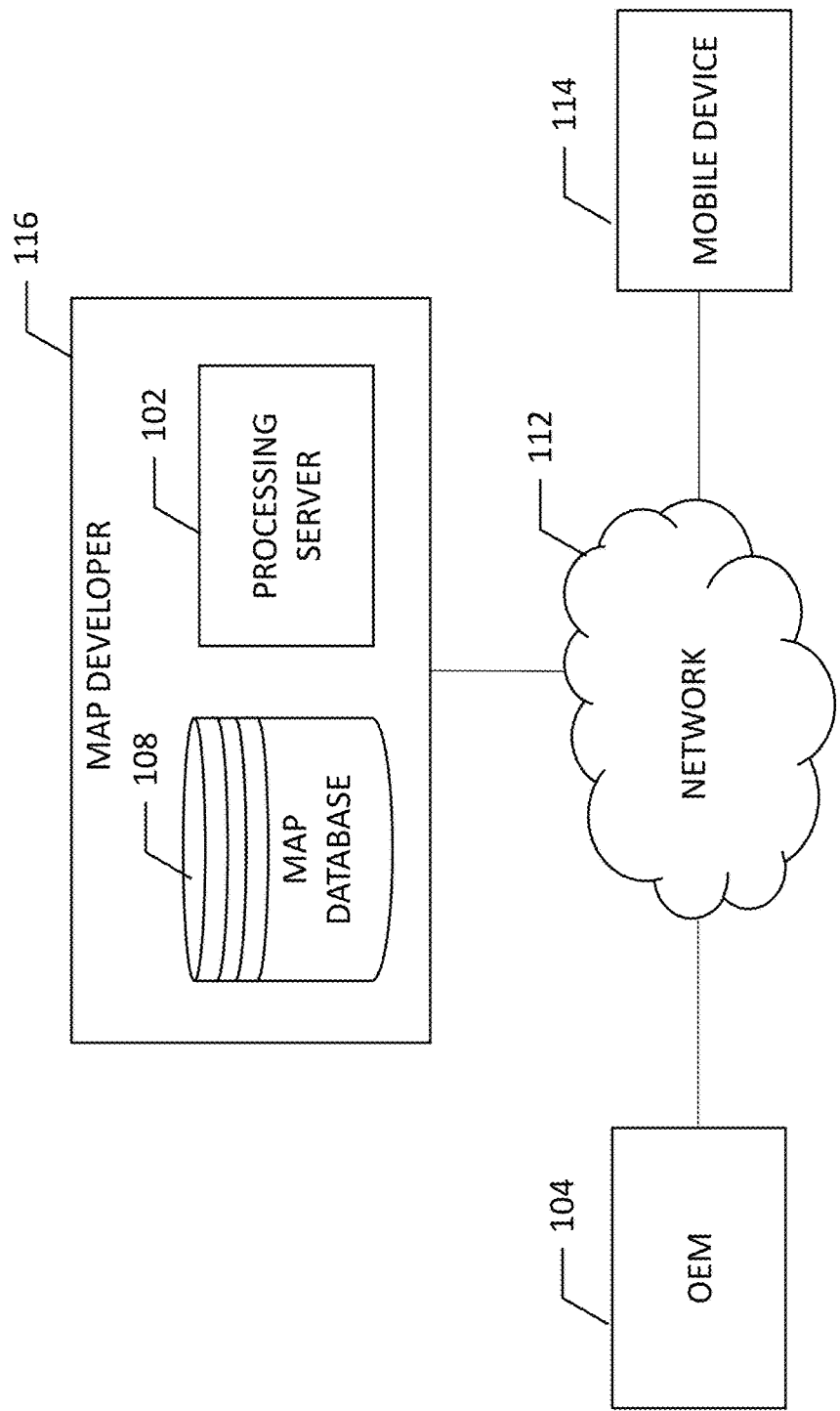
Figure 2:
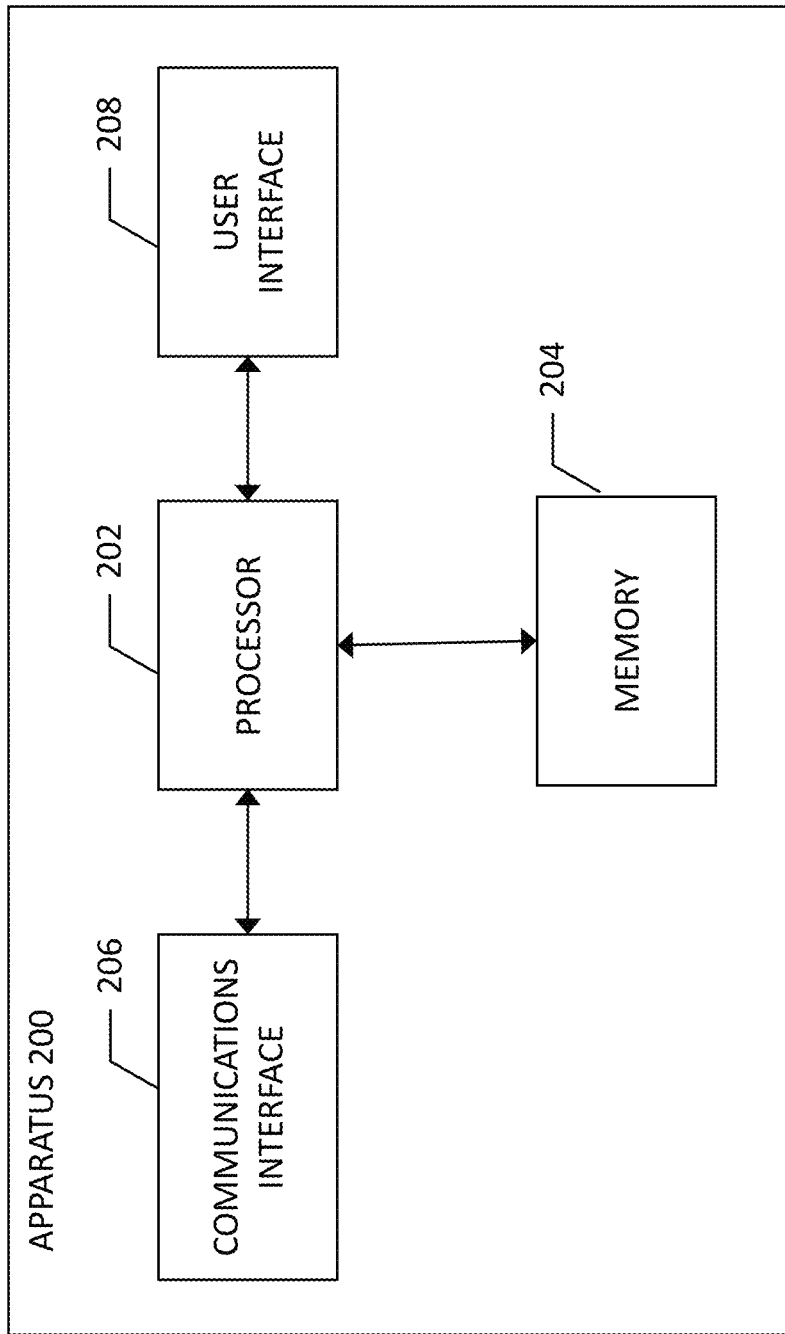
Figure 3:
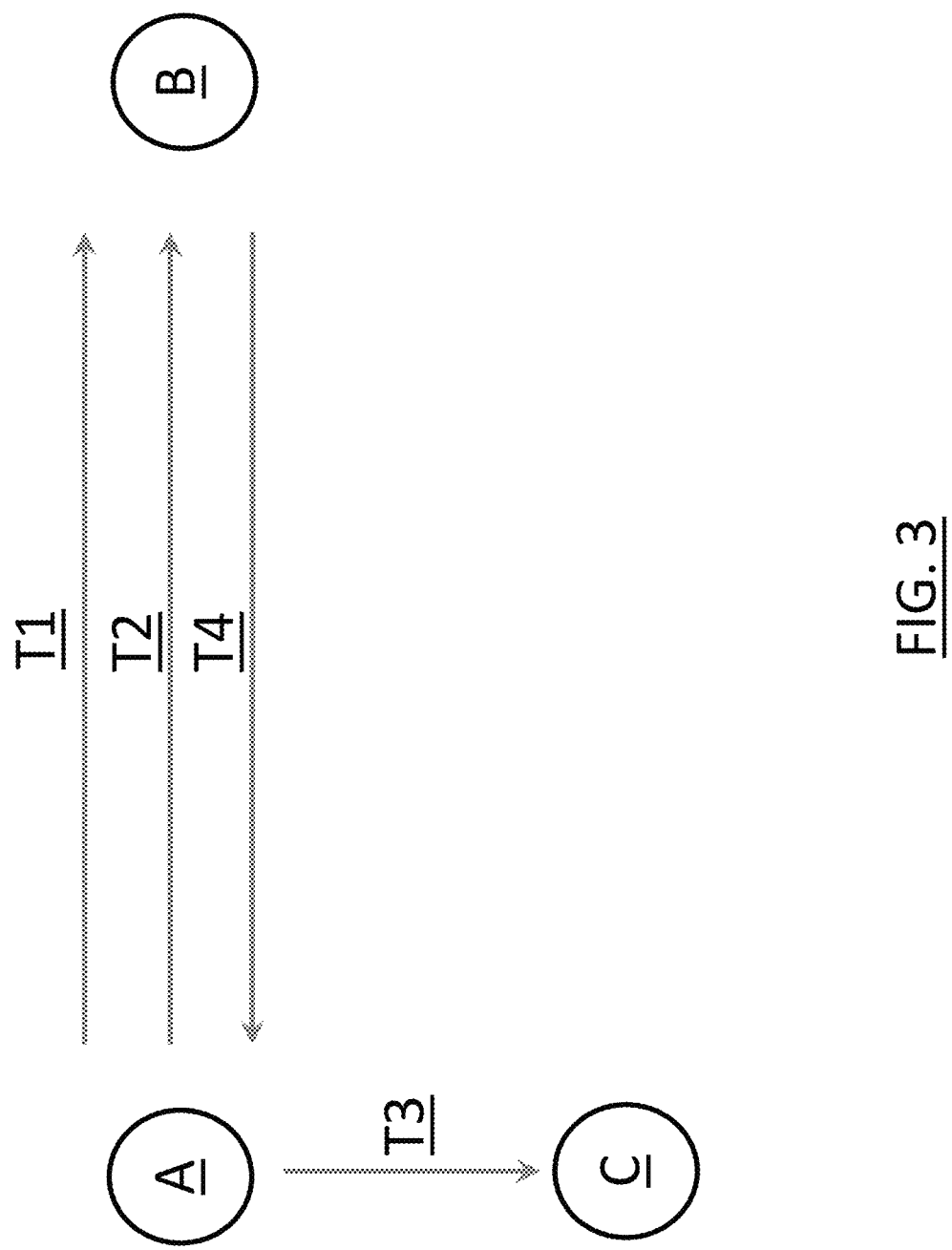
Figure 4:
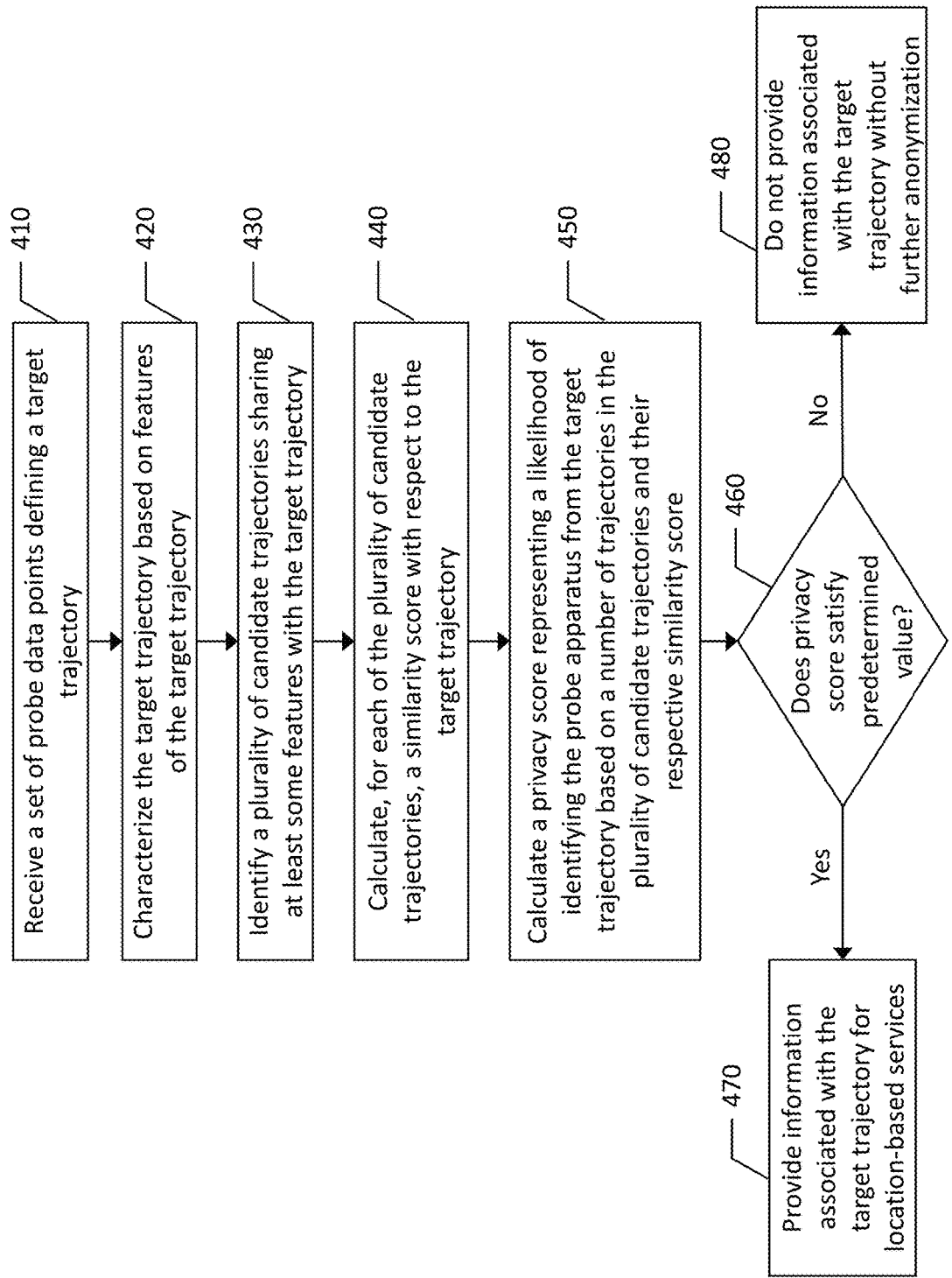

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for quantifying and measuring a linkability of a trajectory with its source in accordance with an example embodiment of the present disclosure;

FIG. 3 illustrates a number of trajectories associated with a group of origin and destination points according to an example embodiment of the present disclosure; and FIG. 4 is a flowchart of a method for quantifying and measuring a linkability of a trajectory with its source according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories (trajectory data) identifies the movement of a user over time. Anonymization of trajectories while providing sufficient information for location based services to be effective requires a balance to be struck between valuable trajectory information including location information of probe data points while also introducing ambiguity for anonymization. Various anonymization algorithms may be applied to trajectory data that obfuscates a source of the trajectory data, thereby preserving the anonymity of a user.

A method, apparatus, and computer program product are provided herein in accordance with an example embodiment for measuring and quantifying the linkability of trajectory data, and more particularly, to measuring and quantifying the linkability of trajectory data based on similarities to other trajectory data. Trajectories for a vehicle and/or mobile device can facilitate the use of location-based services for a variety of functions. However, trajectories themselves may provide substantial information regarding an origin, destination, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which a measure is established that represents the likelihood of an adversary being able to determine the source of a target trajectory, thereby eliminating the anonymity of a trajectory. Location information and more specifically, trajectory information can be gathered and shared in a manner that anonymizes the source of the information and makes unmasking of the source difficult. Embodiments provided herein quantify and measure the linkability of a target trajectory with a source of that target trajectory. The "linkability" is the ability of an adversary to associate the target trajectory with the source. Embodiments thereby determine how difficult it is estimated to be to establish to whom a target trajectory belongs. A privacy score is a measure established as to the difficulty an adversary would have to associate a target trajectory with a source. If a privacy score is satisfied, information associated with the target trajectory may be provided to location-based services such that they may render a service related to the target trajectory and the source thereof.

To provide a method of measuring and quantifying the linkability of trajectory data based on similarities to candidate trajectories, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, functional class, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for measuring and quantifying the linkability of trajectory data, and more particularly, to measuring and quantifying the linkability of trajectory data based on similarities to other trajectory data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 may derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein measure and quantify the linkability of a target trajectory with the source of the target trajectory in the form of a privacy score. This privacy score represents the difficulty with which it is estimated that an adversary would be able to match the target trajectory with the source. Embodiments measure the privacy risk related to releasing a dataset containing mobility data in the form of information associated with a target trajectory. The risk relates to the personal information that can be inferred by comparing this data with other available data, such as additional trajectories.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data and information associated with trajectories to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations.

Available anonymization metrics determine a privacy risk for a trajectory or set of trajectories but do not measure the additional risk caused by combining datasets that contain different information which, once combined, may allow an adversary to gain additional information about a specific individual. The risk from combining complementary data sources is defined herein as the linkability risk.

A trajectory dataset can be combined with a dataset containing personally identifying information about individuals, such as address, gender, age, etc. For example, data from a department of transportation may associate such information to a license plate number or a vehicle model. Data from traffic cameras may contain an image of an individual entering a taxi at a specific time and date. A trajectory dataset could be combined with another trajectory dataset, such as from two consecutive days. Trajectories in one dataset could be associated with trajectories in the dataset using unique characteristics of these trajectories, and this information could help re-identify an individual and/or reveal further personal information about an individual. As an example, related trajectories may all depart from a specific residential area at 7:50 AM and reach a specific commercial area at 8:25 AM. One such trajectory may include a stop over or waypoint at a specific shop. The information about the visit at the shop may increase the risk of re-identifying the individual, such as within a set of candidates obtained from financial transaction records of the shop at that specific date and time. This information may further increase the risk of revealing personal information, such as a purchase at a pharmacy may reveal a medical condition of an individual.

Embodiments of the present invention provide a method, apparatus, and computer program product to quantify and measure the linkability of trajectory data in the form of a privacy score. The process obtains a target trajectory and extracts relevant points, where relevant points can include the origin location, the destination location, and waypoint locations. These relevant points are not required to be precise locations on a map, but could be regions of the map. A sequence of road links that are taken by the target trajectory may also be extracted. The target trajectory is then characterized. Characterization is performed through defining aspects of the target trajectory, such as a time window related to each of the relevant points and the road links. The time component may be critical as linkability may be possible if the time is not precise, such as in the case of the same commute but offset by an hour or the reverse of the commute in the evening. Characterization may also include classification of the relevant points or regions based on features of the map. For example, the relevant points or regions may have a particular point-of-interest profile (e.g., high ratio of restaurants, an office park, a residential area, etc.) and other points in the map with a similar point-of-interest profile may be identified (e.g., two offices associated with one company in different cities).

Characterization of the target trajectory may further include classification of each road link with respective attributes, such as a functional class, speed limit, direction of travel, or any other restriction related to the respective road link of the trajectory. Optionally, characterization may consider turn probabilities, where turn probabilities can be based on map attributes. Characterization may further include finding unique features of the trajectory that can improve linkability. Uniqueness is determined for trajectories, such as a trajectory that is unique with respect to candidate trajectories. Uniqueness can be localized, such as a trajectory that is unique with respect to candidate trajectories in a specific location. An example of localized uniqueness may include a trajectory for a driver that takes a shortcut that may involve taking an illegal turn or maneuver. This uniqueness is localized in a specific region of the map, while the trajectory might not appear unique anywhere else. Examples of non-localized uniqueness include acceleration patterns which may be found in multiple locations and may not depend on any specific location. Some examples of unique features include driving patterns (e.g., sharp turns or acceleration), the presence or absence of sensors in a vehicle, the software version and vehicle status (e.g., wipers on despite no rain), the amount of tips as included in trajectories from taxis or delivery vehicles, the length or duration of the trajectory, whether there are gaps in the reported trajectory data that may reveal stop-overs or entrance to a building, etc.

Upon characterization of a target trajectory, candidate trajectories are sought that share any of the characterizations of the target trajectory. According to an example embodiment, a hash map may be created where the key is the region or the road link and the value is the list of trajectory identifiers that are related to that point. Other attributes may be used to create the keys of the hash map, such as a functional class of the road segment, street names, address ranges, speed limits, turn restrictions, etc. These lists are joined to obtain the trajectories to be considered as described further below. The time component of the target trajectory is considered later so as not to limit the selection of candidate trajectories. The time components can optionally be included directly in the keys of hash maps if similarities between time windows (e.g., morning and evening rush hours) can be computed in advance.

Each candidate trajectory is given a similarity score/weight with respect to the target trajectory. The weights can be defined based on the use case and assumptions about an adversary attempting to determine the source of a target trajectory. It is unknown exactly what information the adversary would use to link the datasets, such that embodiments consider any available information. The more features in common among the datasets (e.g., the candidate trajectories), the more likely the adversary will link the two trajectories.

Similarity scores between candidate trajectories and the target trajectory may be based on a number of factors. If the target trajectory shares regions (e.g., regions of the relevant points) with a candidate trajectory, the similarity may increase for the more regions that are shared. The similarity score may also increase if the relative order of relevant points (or regions thereof) is the same or is inverted (e.g., reverse commutes or return trips). Similarity scores between candidate trajectories and the target trajectory may optionally be based on shared road links. Some drivers between a first origin and first destination may prefer shortcuts, while other may prefer less congested areas or more scenic routes. The time windows where the relevant points, regions of relevant points, or road links are traversed may influence the similarity score. The similarity score may be higher if the times are similar or if they have the same meaning (e.g., rush hour, or morning/afternoon/evening hours). A trajectory that goes from A to B during the morning rush hour may be similar to a trajectory that goes from B to A during the evening rush hour. The number of similar or identical features common across trajectories may further influence the similarity score.

The linkability risk is computed based on the candidate trajectories and their respective similarity scores. Linkability risk is lower if there are candidate trajectories with high similarity scores as an adversary will have difficulty distinguishing between these trajectories. Further, if there are many candidate trajectories that are at least somewhat similar, there is a higher likelihood of false positives for the adversary attempting to link a target trajectory to a source. The linkability risk provides a measure of the privacy score representing a likelihood of identifying the source probe apparatus from the target trajectory. In principle, two trajectories that are very similar are likely to belong to the same user, such that linkability is high. However, the two trajectories may actually belong to different users. Linkability risk is lower when there are numerous trajectories that are similar and are unlikely to be all associated to the same individual. This may occur when trajectories at least partially overlap in space and time, affirming that the trajectories are from different individuals, such that re-identification is difficult.

Trajectories can be linked to their source through a number of methods used by adversaries. For example, trajectories may be linked to a source (e.g., a person) based on photos captured of the person (e.g., photos of a celebrity or a "photographed person" example) which can be used to re-identify which person took which taxi and to infer how much they tipped a driver of the taxi. Another example is a "commuter" example that includes where trajectories from different datasets are linked via repeating patterns in the data, such as the same person commuting from home to work every weekday at the same time. Given these examples, embodiments can quantify and measure a privacy score of the target trajectory. The trajectories are characterized according to relevant features that can help associate these target trajectories with additional data. In the case of the photos captured of the photographed person, the linking is based on the pick-up and drop-off of the taxi, as both the trajectory and the photo are geo-located in the same area and at a similar point in time. In the commuter example case, the linking is also possible on the start and end of the trajectory (e.g., home and work), but also on features of the trajectory such as driving patterns (e.g., sharp turns or acceleration), the presence/absence of sensors in the vehicle, or metadata such as software version, for example.

Generally, waypoints along a trajectory or dwell points may be important as they can relate directly to the purpose of a trip (e.g., work, taking children to school) and to a person (e.g., home), but linkage could also be performed on routes (e.g., traffic camera capturing a vehicle) or a person consistently choosing one uncommon route (e.g., a shortcut or scenic view). Though waypoints are more likely to lead to linkage and also may reveal personal information about an individual.

Characterizing trajectories based on their location data, such as a latitude and longitude, may not lead to meaningful results. Characterization is more effective when based on the semantic meaning of areas, such as a polygon that has the semantic meaning of a hospital. Different areas may have the same semantic meaning, such as when a company has two offices in two different cities, and these two locations share the same semantic meaning. It is therefore important to identify these locations by partitioning the map into semantic areas. Map matching can be used to associate each location with a road link identifier, with a sequence of road links describing the semantic meaning of the route taken by the driver or occupant of the vehicle.

People are unique in the paths they take, with some people preferring shortcuts that may involve illegal maneuvers, some people preferring the fastest route, some people prefer the most efficient route (e.g., least stop-and-go), some people prefer the shortest route, and some people prefer the most scenic route. Some people commute by bike and might therefore choose routes covered by cycling paths. In some instances, road restrictions that apply to car traffic may not apply to other modes of transport (e.g., one-way for cars may be two-way for bikes).

Characterization of trajectories may also depend on the time component. The semantic meaning of the time may vary in different locations. For example, the time of 10:00 PM may have the semantic meaning of 'closed' when associated to the location of a coffee shop, and the semantic meaning of 'open' when associated to the location of a night club. Further, different times may have the same meaning. For example, 8:00 AM on a Monday and 8:00 AM on a Tuesday may have the same meaning of 'rush hour'. The semantic meaning of time can also be defined as a time window (e.g., the rush hour time in the morning could be any time between 6:00 AM and 8:00 AM). It is therefore beneficial to characterize trajectories also based on the time component. For example, trajectories that leave from residential area A at 7:50 AM and reach a specific commercial area B at 8:25 AM are likely to be related to the same individual. Similarly, these trajectories are likely related to other trajectories that go from B to A at 5:00 PM.

Other ways of characterization of trajectories are features of the trajectory itself. For example, a unique driving pattern may enable linkage of a trajectory with a specific individual. Driving patterns can be related to the sharpness of turns or acceleration that can be derived from the speed and heading component of the trajectories; speed values above the limit may enable a link to a trajectory with images from speed radar units at specific locations which can also reveal a license plate number. Other patterns related to the vehicle, such as the presence and version of a specific sensor may be revealed from properties of the trajectory (e.g., a higher sampling rate, higher resolution imaging, automatic course correction, etc.). Knowing the specific model of the vehicle may enable reduction in the number of candidate trajectories for linkage and as well the number of candidate individuals, such as when only a small number of people in a geographic region own a specific vehicle model. The presence of gaps in a trajectory, that may be caused by stop-overs or waypoints (e.g., leaving a car overnight and restarting in the morning, or by a lack of signal that is typically in a tunnel or parking garage). This information could help re-identification or linking of an individual or inference of personal information from a trajectory. The characterization of a trajectory can be performed on demand or it can be executed in advance of identifying candidate trajectories as described further below.

Once the target trajectory is characterized, candidate trajectories may be identified. For the selection of candidate trajectories, stay points (e.g., waypoints or dwell points) may have a higher likelihood of leading to a linkage between the target trajectory and a source of the target trajectory because individuals spend more time at these points relative to other points of the trajectory. In the photographed person example embodiment above where a photograph of a person is captured as they enter a taxi, the selection of candidate trajectories may begin with one specific picture to which a location and time are associated. This location and time are the starting point for the selection of trajectories. In the commuter example described above, the starting point may be the beginning of a trajectory of interest, and the end may be any stay point present in the commuting target trajectory. The selection process then considers other trajectories which share any of these stay points.

In order to increase the efficiency and speed of the selection process, a pre-processing step may be performed that creates a heatmap where the key is a unique identifier that relates to the region or to a road link and the value is the list of trajectory identifiers that are related to that point.

According to an example embodiment illustrated in FIG. 3, trajectory T1 starts at location A and ends at location B. Trajectory T2 starts at location A and ends at location B. Trajectory T3 starts at location A and ends at location C. Trajectory T4 starts at location B and ends at location A. For this example, it is assumed that the time components of all of these stay points are related with each other, such as if they are all during rush hour epochs. A hash map is computed as a pre-processing step as semantic meanings of trajectories do not vary with time. The hash map keys can contain road link identifiers or a combination of region identifier (of the stay point) and a description of the time window.

TABLE 1

| Stay point ID | Trajectory ID |
|---|---|
| A | T1, T2, T3, T4 |
| B | T1, T2, T4 |
| C | T3 |

Using the hash map the candidate trajectories that could match with trajectory T1 are identified. This process would identify that trajectory T1 is associated with locations (or regions) A and B. A list of trajectory identifiers that can be associated with these points are identified from the hash map to include trajectories T1, T2, T3, and T4 for location A, and trajectories T1, T2, and T4 for location B. The lists are merged to identify the unique candidate trajectories T1, T2, T3, and T4.

Once the candidate trajectories have been identified, similarity scores may be generated for each candidate trajectory. The similarity score defines how the candidate trajectory is similar to the target trajectory and how likely that they have been generated by the same individual. In the case of the photographed person example of the person getting into a taxi, this score identifies how likely a trajectory is associated to the person in the photo (e.g., a taxi ride that ends at a television studio may be more likely to be associated with a celebrity than a trajectory that ends at a supermarket). In the commuter example above, a trajectory that starts and ends at the same locations as the target trajectory is more likely to be related to the same individual than a trajectory that only stops over at one of these points (e.g., that might more likely identify a friend visiting the source of the target trajectory at their home or a work connection having a meeting with the source at their work location).

The similarity score can also consider the similarity between regions as well as the number of common regions between trajectories. The similarity score can consider the time component, such as identifying that a trajectory that goes from B to A at 5:00 PM is more similar to a trajectory that goes from A to B at 8:00 AM than a trajectory that goes from A to B at 5:00 PM. The similarity score can also reflect features of the trajectories, such as an indication that a candidate who shares driving patterns with the target trajectory (or an unusual route) as a higher similarity.

A privacy score representing the linkability risk or ability to associate a target trajectory with a source can be computed from the similarity scores of the candidate trajectories and a number of candidate trajectories. The privacy score defines what the likelihood that publishing the dataset without further anonymization would reveal personal information about the individual.

A similarity score is relatively high when there is one candidate trajectory with a high similarity score relative to the target trajectory and few candidates with low similarity scores. In the example above of the person photographed entering a taxi, one candidate trajectory starts at the precise location where the photo was taken and ends at a television studio, while another candidate trajectory starts at a nearby location and ends at a supermarket. This renders the privacy score very low as it is relatively easy to associate the target trajectory with the source of the target trajectory.

A privacy score may be very high when there are many candidate trajectories with low similarities. Having many candidate trajectories with high similarities may lead to a risk of linkability. In the commuter example above, any candidate trajectories may correspond to commute trips in different days, and therefore provide additional information about the behaviors of the individual source of the target trajectory. On the contrary, in the photographed person entering a taxi, many candidates with high similarity scores may make the task of linking one trajectory to the person photographed more difficult, thereby reducing the linkability risk and increasing the privacy score. Therefore, the translation from similarity scores to linkability risk and privacy score should be tailored to each use case to reflect the characteristics of the data.

The privacy scores generated by example embodiments herein may be used to determine further actions. For example, if the privacy score satisfies a predetermined criterion (e.g., meeting a minimum privacy score value), this indicates that the linkability risk of linking the target trajectory with the source is low, and the target trajectory or information associated with the target trajectory may be published to a location-based service provider. If a privacy score fails to satisfy a predetermined criteria, the linkability risk of linking the target trajectory with the source may be too high, and further actions may be taken. For example, if the linkability risk is too high, the target trajectory or information associated with the target trajectory may be further anonymized, such as by using an anonymization algorithm (e.g., splitting and gapping) on the target trajectory to reduce the linkability risk and improve the privacy score.

FIG. 4 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method for measuring and quantifying the linkability of trajectory data, and more particularly, to measuring and quantifying the linkability of trajectory data based on similarities to candidate trajectory data. A set of probe data points defining a target trajectory are received at 410. The set of probe data points may be received, for example, by an OEM 104 from a vehicle or mobile device 114. The probe data points may include at least a location (e.g., latitude and longitude) and a time stamp. The target trajectory is characterized at 420 based on features of the target trajectory. Features may include locations of the origin, destination, and waypoints, regions around the origin, destination, and waypoints, profiles (e.g., point-of-interest profiles) of the regions around the origin, destination, and waypoints, and road segments of the trajectory, for example. Based on the features of the target trajectory, a plurality of candidate trajectories are identified at 430 that share at least some features with the target trajectory. For each of the candidate trajectories, a similarity score is calculated at 440 with respect to the target trajectory. A probability score is calculated at 450 that represents a likelihood of identifying the probe apparatus from the target trajectory based on a number of trajectories in the plurality of candidate trajectories and their respective similarity score. At 460 it is determined if the privacy score satisfies a predetermined value. The predetermined value may be a value that is determined to represent sufficient privacy between the target trajectory information and the source of the target trajectory. If the privacy score satisfies the predetermined value, information associated with the target trajectory may be shared with location-based services at 470. If the privacy score fails to satisfy the predetermined value, information associated with the target trajectory is not shared without further anonymization as shown at 480.

In an example embodiment, an apparatus for performing the method of FIG. 4 above may comprise a processor (e.g., the processor 202) configured to perform some or each of the operations (410-480) described above. The processor may, for example, be configured to perform the operations (410-480) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-480 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    receive a set of probe data points defining a target trajectory from a probe apparatus;
    characterize the target trajectory based on features of the target trajectory;
    identify a plurality of candidate trajectories sharing at least some features with the target trajectory;
    calculate, for each of the candidate trajectories, a similarity score with respect to the target trajectory, wherein the similarity score for a candidate trajectory reflects a similarity between shared features of the candidate trajectory with the target trajectory;
    calculate a privacy score representing a likelihood of identifying the probe apparatus from the target trajectory based on a number of trajectories in the plurality of candidate trajectories and their respective similarity score, wherein the privacy score increases responsive to an increase in the number of trajectories and responsive to an increase in a number of shared features of each candidate trajectory with the target trajectory; and
    provide information associated with the target trajectory for location-based services in response to the privacy score satisfying a predetermined value.

2. The apparatus of claim 1, wherein the apparatus is further caused to:
    extract relevant points from the set of probe data points defining the target trajectory, wherein relevant points comprise an origin point of the target trajectory, a destination point of the target trajectory, and waypoints of the target trajectory.

3. The apparatus of claim 2, wherein the apparatus is further caused to: extract a sequence of road links of the target trajectory.

4. The apparatus of claim 3, wherein features of the target trajectory comprise one or more of: a time at which the target trajectory was traversed, point-of-interest types in a region corresponding to the relevant points, functional class of road links of the sequence of road links, or travel restrictions of road links of the sequence of road links.

5. The apparatus of claim 4, wherein causing the apparatus to calculate, for each of the plurality of candidate trajectories, a similarity score with respect to the target trajectory comprises causing the apparatus to:
    calculate, for each of the plurality of candidate trajectories, a similarity between locations of relevant points;
    calculate, for each of the plurality of candidate trajectories, a similarity between shared road links with the target trajectory; and
    calculate, for each of the plurality of candidate trajectories, a similarity between a time of traversal of the candidate trajectories with the time at which the target trajectory was traversed.

6. The apparatus of claim 1, wherein the privacy score increases with a higher number of the plurality of candidate trajectories at least partially overlapping in space and time with the target trajectory.

7. The apparatus of claim 1, wherein the apparatus is further caused to:
    anonymize the target trajectory in response to the privacy score failing to satisfy a predetermined value, wherein causing the apparatus to anonymize the target trajectory comprises at least one of redacting at least a portion of the target trajectory or applying an anonymization algorithm to the target trajectory.

8. The apparatus of claim 7, wherein the apparatus is further caused to:
    provide information associated with the target trajectory for location-based services in response to the privacy score failing to satisfy a predetermined value and the apparatus being caused to anonymize the target trajectory.

9. A computer program product comprising at least one non-transitory computer-readable storage medium having computer-executable program code portions stored therein, the computer-executable program code portions comprising program code instructions configured to:

receive a set of probe data points defining a target trajectory from a probe apparatus;

characterize the target trajectory based on features of the target trajectory;

identify a plurality of candidate trajectories sharing at least some features with the target trajectory;

calculate, for each of the plurality of candidate trajectories, a similarity score with respect to the target trajectory, wherein the similarity score for a candidate trajectory reflects a similarity between shared features of the candidate trajectory with the target trajectory;

calculate a privacy score representing a likelihood of identifying the probe apparatus from the target trajectory based on a number of trajectories in the plurality of candidate trajectories and their respective similarity score, wherein the privacy score increases responsive to an increase in the number of trajectories and responsive to an increase in a number of shared features of each candidate trajectory with the target trajectory; and provide information associated with the target trajectory for location-based services in response to the privacy score satisfying a predetermined value.

10. The computer program product of claim 9, further comprising program code instructions configured to:

extract relevant points from the set of probe data points defining the target trajectory, wherein relevant points comprise an origin point of the target trajectory, a destination point of the target trajectory, and waypoints of the target trajectory.

11. The computer program product of claim 10, further comprising program code instructions configured to: extract a sequence of road links of the target trajectory.

12. The computer program product of claim 11, wherein features of the target trajectory comprise one or more of: a time at which the target trajectory was traversed, point-of-interest types in a region corresponding to the relevant points, functional class of road links of the sequence of road links, or travel restrictions of road links of the sequence of road links.

13. The computer program product of claim 12, wherein the program code instructions to calculate, for each of the plurality of candidate trajectories, a similarity score with respect to the target trajectory comprise program code instructions configured to:

calculate, for each of the plurality of candidate trajectories, a similarity between locations of relevant points;

calculate, for each of the plurality of candidate trajectories, a similarity between shared road links with the target trajectory; and calculate, for each of the plurality of candidate trajectories, a similarity between a time of traversal of the candidate trajectories with the time at which the target trajectory was traversed.

14. The computer program product of claim 9, wherein the privacy score increases with a higher number of the plurality of candidate trajectories at least partially overlapping in space and time with the target trajectory.

15. The computer program product of claim 9, further comprising program code instructions configured to:

anonymize the target trajectory in response to the privacy score failing to satisfy a predetermined value, wherein the program code instructions to anonymize the target trajectory comprise program code instructions configured to, at least one of, redact at least a portion of the target trajectory or apply an anonymization algorithm to the target trajectory.

16. The computer program product of claim 15, further comprising program code instructions configured to:

provide information associated with the target trajectory for location-based services in response to the privacy score failing to satisfy a predetermined value and the program code instructions anonymizing the target trajectory.

17. A method comprising:

receiving a set of probe data points defining a target trajectory from a probe apparatus;

characterizing the target trajectory based on features of the target trajectory;

identifying a plurality of candidate trajectories sharing at least some features with the target trajectory;

calculating, for each of the plurality of candidate trajectories, a similarity score with respect to the target trajectory, wherein the similarity score for a candidate trajectory reflects a similarity between shared features of the candidate trajectory with the target trajectory;

calculating a privacy score representing a likelihood of identifying the probe apparatus from the target trajectory based on a number of trajectories in the plurality of candidate trajectories and their respective similarity score, wherein the privacy score increases responsive to an increase in the number of trajectories and responsive to an increase in a number of shared features of each candidate trajectory with the target trajectory; and providing information associated with the target trajectory for location-based services in response to the privacy score satisfying a predetermined value.

18. The method of claim 17, further comprising:

extracting relevant points from the set of probe data points defining the target trajectory, wherein relevant points comprise an origin point of the target trajectory, a destination point of the target trajectory, and waypoints of the target trajectory.

19. The method of claim 18, further comprising: extracting a sequence of road links of the target trajectory.

20. The method of claim 19, wherein features of the target trajectory comprise one or more of: a time at which the target trajectory was traversed, point-of-interest types in a region corresponding to the relevant points, functional class of road links of the sequence of road links, or travel restrictions of road links of the sequence of road links.

* * * * *

UNITED STATES PATENT AND TRADEMARK OFFICE
CERTIFICATE OF CORRECTION

PATENT NO. : 11,914,747 B2
APPLICATION NO. : 17/249851
DATED : February 27, 2024
INVENTOR(S) : Stefano Bennati et al.

Page 1 of 1

It is certified that error appears in the above-identified patent and that said Letters Patent is hereby corrected as shown below:

On the Title Page

In Column 2 item (57), ABSTRACT, Line 3, delete "describer herein." and insert -- described herein. --, therefor.

Signed and Sealed this
Twenty-fifth Day of June, 2024

Katherine Kelly Vidal
*Director of the United States Patent and Trademark Office*